June 7, 1927.

C. LEA 1,631,742

LUBRICATOR

Filed Jan. 31, 1923

Inventor:
Charles Lea
by Emery, Booth, Janney & Varney,
Attys.

Patented June 7, 1927.

1,631,742

UNITED STATES PATENT OFFICE.

CHARLES LEA, OF BOSTON, MASSACHUSETTS, ASSIGNOR, BY MESNE ASSIGNMENTS, TO FREDERICK C. BLANCHARD, OF DORCHESTER, MASSACHUSETTS.

LUBRICATOR.

Application filed January 31, 1923. Serial No. 616,062.

My invention aims to provide a novel and improved apparatus for furnishing lubricant to automobile parts and other machinery. The invention will be best understood by reference to the following description, when taken in connection with the accompanying drawings of one specific embodiment thereof, while its scope will be more particularly pointed out in the appended claims.

Figure 1:
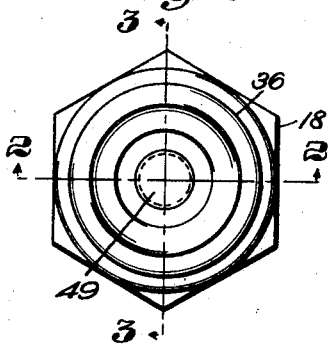
Fig. 1 is a plan of a lubricator exemplifying the invention.

Referring to the drawings, and to the embodiment of the invention which is selected for exemplification, there is shown a lubricator comprising a reservoir 4 having an inlet 6 and an outlet 8, the latter to be connected with the bearing to be lubricated.

In the present example, the reservoir is formed as a part of a casing 10 conveniently stamped or drawn from sheet metal, and having its lower portion threaded as at 12 onto a base 14, which presents at its lower end a threaded nipple 15, in which the outlet 8 is formed. This nipple may be screwed into an opening leading to the bearing, and to facilitate this operation, the base 14 is herein provided with a polygonal portion 18 to receive a wrench, not shown.

To ensure an ample supply of lubricant between the bearing surfaces, and to carry away the foreign substances, provision is made for initial flooding of the bearing, followed by a relatively slow feeding of oil thereto. There are two passages leading from the reservoir to the outlet, one of them being presented by a tube 20, the lower end of which is tightly fitted into the outlet passage 8. The other passage is presented by an annular chamber 22, formed in the base 14 about the tube 20, and communicating with the interior of the latter by way of one or more, herein a plurality of openings 24, provided in the circumferential wall of the tube. The tube 20 has a force fit in the passage 8, and is firmly held therein merely by frictional engagement therewith. A slow feeding of oil to the bearing is permitted by a suitable permeable barrier, herein a ring 26 of porous felt, or other appropriate construction, preferably forced into place and held there by friction, as well as by the presence of the tube 20, so that it may be readily removed and replaced by another, simply by removing and replacing the tube. The proportions and density of the felt ring are selected to suit the particular conditions under which the oil cup is used, and if the rate of feed is not correct, the plug may be removed and a different one substituted, or the effective size of the passage may be varied by changing the height of the tube.

Figure 2:
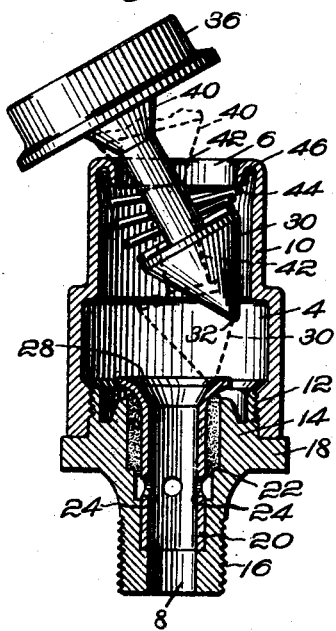
Fig. 2 is a sectional view on line 2—2 of Fig. 1, showing the lubricator open for filling.
Figure 3:
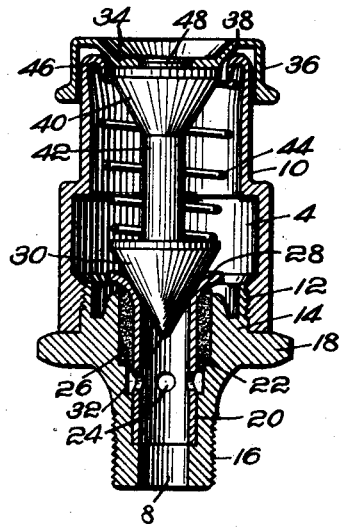
Fig. 3 is a sectional view on line 3—3 of Fig. 1, showing the lubricator in its normal closed position.

The upper portion of the tube presents a seat 28, which is normally closed by a valve 30 cooperating therewith and preventing the escape of oil therethrough, but when lifted to some such position as that illustrated in Fig. 2, permits flooding of the bearing. On the other hand, when the valve is closed, a slow feeding of oil to the bearing is permitted by the permeable barrier. Preferably, the valve and its seat are tapered, the valve herein being conical, and the seat having a rounded outward flare or bell-mouth, whereby the valve, when displaced axially and laterally, will be guided back to its normal position without danger of lodging in an incorrect position. This action is well illustrated by the dotted line position of the valve in Fig. 2. Preferably, the apex of the valve is somewhat rounded, as at 32, the better to cooperate with the bell-mouth valve seat in the restoration of the valve to its normal position, after being released.

The inlet of the reservoir is normally closed and protected against the entrance of foreign matter by a suitable cover, herein a cap 34 conveniently formed of sheet metal and having a depending flange 36 normally disposed about the upper portion of the reservoir. Admission of air to the reservoir to facilitate the escape of lubricant therefrom may be accomplished by the provision of an air admission opening such as a clearance space 38, between the cap and body of the casing. If the air admission opening be employed in installations where the reservoir is subject to agitation, as in a motor car, it may be desirable to provide suitable means tending to prevent oil from slopping out through the opening, as by providing the cap with a frusto-conical depending formation 40, which serves as a baffle to return toward the bottom of the reservoir oil which slops in an upward direction thereabout. This formation serves another useful purpose, namely: that of cooperating with the conical valve to guide the cover and valve back to their normal position (see Fig. 2), after having been displaced therefrom.

Preferably, the operations of the cover and valve are coordinated, and suitable means are provided yieldingly to resist opening of the cover and valve, and to restore them to their closed positions, after being opened. Herein, the cover and valve are connected by a stem 42, about which is a helically coiled compression spring 44, the lower end of which rests against the valve, while its upper end is seated against a suitable fixed abutment, herein an inwardly and downwardly directed flange 46, which also serves as a baffle tending to return toward the bottom of the reservoir oil which slops upward along the sides of the reservoir. The spring shown is preferred because it serves as a positive stop to limit outward movement of the cap and valve, owing to the fact that the convolutions will abut against one another (see Fig. 2). Removal of the cover and valve is impossible without releasing the upper end of the spring from beneath the flange 46. The valve, its stem and conical formation at the upper portion of the latter, are conveniently made in one piece, and attached to the cover as by the provision of a reduced portion extending through the cover, and riveted as at 48.

To operate the device, the cover and valve are displaced axially and laterally to some such position as that represented in full lines in Fig. 2, thereby affording a suitable filling opening. This operation may be accomplished by the use of the fingers, or by an appropriate filling implement, which is not illustrated herein. When oil is supplied to the reservoir, it follows that at first the oil will run freely through the outlet to the bearing, thus flooding the latter. When the bearing has taken up all the oil it can hold, as the supply of oil to the reservoir continues, the level will rise toward the top of the latter. The supply of oil should be discontinued when the reservoir is nearly or quite filled, after which the cover should be released, and the cover and valve allowed to close under the influence of the spring. The working part which is thus lubricated can be started with the assurance of an ample supply of oil. Subsequently, during the operation, a slow feeding of oil takes place by way of the normal feeding device, herein by seepage through the felt ring, the density and proportions of which, as before stated, are such as to permit the proper rate of feeding to suit the particular circumstances.

Having thus described one embodiment of the invention, but without limiting myself thereto, what I claim and desire by Letters Patent to secure is:

1. A lubricator comprising means presenting a reservoir, and an outlet therefor, a tube presenting a valve seat and a passage from said reservoir to said outlet, a valve normally seated endwise on said seat, means presenting a second passage laterally of the first from said reservoir to said outlet, and a permeable barrier controlling the flow through said second passage.

2. A lubricator comprising means presenting a reservoir, a tube presenting a longitudinal passage affording an upper outlet from said reservoir and an opening through the wall of said tube affording a lower outlet from said reservoir, and a permeable barrier controlling said lower outlet.

3. A lubricator comprising means presenting a reservoir, a tube presenting a longitudinal passage affording an upper outlet from said reservoir and an opening through the wall of said tube affording a lower outlet from said reservoir, means controlling said upper outlet, and means controlling said lower outlet.

4. A lubricator comprising means presenting a reservoir, a tube presenting a longitudinal passage affording an upper outlet from said reservoir and an opening through the wall of said tube affording a lower outlet from said reservoir, valve means controlling said upper outlet, and permeable means controlling said lower outlet.

5. A lubricator having a reservoir presenting an inlet for the introduction of oil, two passages for the flow of oil from said reservoir to a common point of delivery, and an axially and laterally displaceable member presenting a cover for said inlet and a valve for one of said passages.

6. A lubricator having a reservoir presenting an inlet for the introduction of oil, two passages for the flow of oil from said reservoir to a common point of delivery, a permeable barrier controlling the flow of oil through one of said passages and disposed about the other, and an axially and laterally displaceable rigid member presenting a cover for said inlet and a valve for such other passage.

7. A lubricator having a reservoir presenting an inlet and an outlet, a tube presenting a passage for the flow of oil from said reservoir to said outlet, a passage about said tube affording a second means of communication between said reservoir and said outlet, a permeable barrier controlling the flow of oil through the second-mentioned passage, a cover for said inlet, a valve for the first-mentioned passage, and a connection between said cover and said valve for causing opening movement of one to be accompanied by opening movement of the other.

8. A lubricating apparatus comprising, in combination, a reservoir comprising a casing presenting a reservoir having an orifice at its upper end and an inwardly directed flange about said orifice, a base threaded onto the lower end of said casing and presenting a downwardly directed, threaded nipple having a vertical passage therein, a tube having its lower end supported in said passage, and its upper end presenting a valve seat, said tube being provided with one or more lateral openings through its wall, said base and tube presenting an annular chamber about said tube, communicating with said reservoir and communicating through said opening or openings with said passage, a porous ring received in said chamber, a cover normally covering said orifice, a valve normally seated on said valve seat, a connection between said cover and said valve to cause opening and closing movement of one to be accompanied by opening and closing movement of the other, and a spring seated at one end against said flange and at its other end against said valve and serving to restore said valve and said cover to their closed positions.

9. A lubricating apparatus comprising, in combination, a reservoir comprising a casing presenting a reservoir having an orifice at its upper end and an inwardly directed flange about said orifice, a base threaded onto the lower end of said casing and presenting a downwardly directed, threaded nipple having a vertical passage therein, a tube having its lower end supported in said passage and its upper end presenting a valve seat, said tube being provided with one or more lateral openings through its wall, said base and tube presenting an annular chamber about said tube, communicating with said reservoir and communicating through said opening or openings with said passage, a porous ring received in said chamber, a cover normally covering said orifice and carrying an inverted conical formation, a valve normally seated against said valve seat and having an inverted conical formation, a stem connecting said cover and said valve, and a spring encircling said stem, seated at one end against said flange and at its other end against said valve.

10. A lubricating apparatus comprising, in combination, a reservoir comprising a casing presenting a reservoir having an orifice at its upper end and an inwardly directed flange about said orifice, a base threaded onto the lower end of said casing and presenting a downwardly directed, threaded nipple having a vertical passage therein, a tube having its lower end supported in said passage and having its upper end presenting an outwardly flared valve seat, said tube being laterally apertured, said base and tube presenting an annular chamber about said tube, communicating with said reservoir and communicating through the aperture of said tube with said passage, a porous ring received in said chamber, a cover normally covering said orifice, a valve normally seated on said valve seat, a connection between said cover and said valve to cause opening and closing movement of one to be accompanied by opening and closing movement of the other, and a spring seated at one end against said flange and at its other end against said valve and serving to restore said valve and said cover to their closed positions.

In testimony whereof, I have signed my name to this specification.

CHARLES LEA.